(12) United States Patent
Kranz

(10) Patent No.: US 10,763,908 B2
(45) Date of Patent: Sep. 1, 2020

(54) MOBILE PHONE WITH ENHANCED FUNCTIONS

(75) Inventor: Vladimir Kranz, Prague (CZ)

(73) Assignee: Vladimir Kranz, Prague (CZ)

( * ) Notice: Subject to any disclaimer, the term of this patent is extended or adjusted under 35 U.S.C. 154(b) by 749 days.

(21) Appl. No.: 13/820,156

(22) PCT Filed: Sep. 6, 2011

(86) PCT No.: PCT/CZ2011/000088
§ 371 (c)(1),
(2), (4) Date: May 19, 2014

(87) PCT Pub. No.: WO2012/031575
PCT Pub. Date: Mar. 15, 2012

(65) Prior Publication Data
US 2018/0205406 A1     Jul. 19, 2018

(30) Foreign Application Priority Data
Sep. 6, 2010 (CZ) .................................. 2010-665

(51) Int. Cl.
| | |
|---|---|
| *H04B 1/3827* | (2015.01) |
| *H04M 1/02* | (2006.01) |
| *H04M 1/05* | (2006.01) |
| *H04M 1/60* | (2006.01) |
| *A44C 5/00* | (2006.01) |
| *H02J 7/00* | (2006.01) |
| *H04M 1/15* | (2006.01) |

(52) U.S. Cl.
CPC .......... *H04B 1/385* (2013.01); *A44C 5/0007* (2013.01); *H04M 1/0262* (2013.01); *H04M 1/05* (2013.01); *H04M 1/6058* (2013.01); *H02J 7/0045* (2013.01); *H04B 2001/3872* (2013.01); *H04M 1/15* (2013.01)

(58) Field of Classification Search
CPC ..... H04B 1/385; A44C 5/0007; H04M 1/0262
USPC ...................................................... 455/550.1
See application file for complete search history.

(56) References Cited

U.S. PATENT DOCUMENTS

| | | | |
|---|---|---|---|
| 6,192,253 B1 * | 2/2001 | Charlier | H04B 1/385 455/340 |
| 2009/0069045 A1 * | 3/2009 | Cheng | H02J 7/0042 455/556.1 |

* cited by examiner

*Primary Examiner* — Ayodeji O Ayotunde

(57) ABSTRACT

The presented solution enables placement of mobile device advantageously formed by central control unit (9z) or mobile phone in removable condition, in holder (805) placed on bracelet (806), on wrist (836). Device can be formed, with the advantage, by mobile phone which is possible to remove out of holder (805), for to make call, by loosening bolts (812), pressing buttons (808) and put earphone to ear. The device is possible to be shifted to other holders (805), placed on various places or objects.

8 Claims, 10 Drawing Sheets

Figure 7:
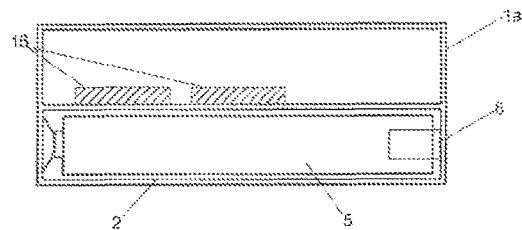

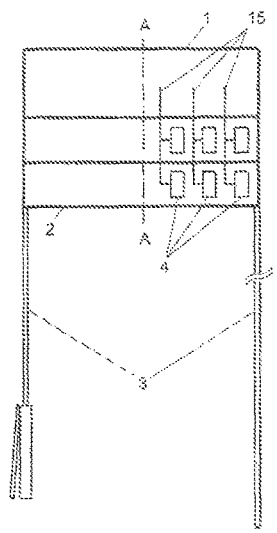
FIG.1
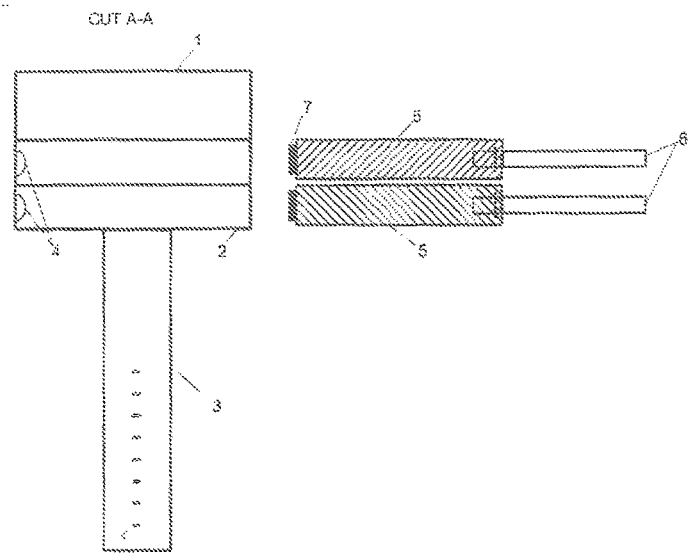
FIG.2 CUT A-A
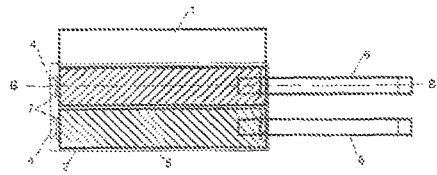
FIG.3
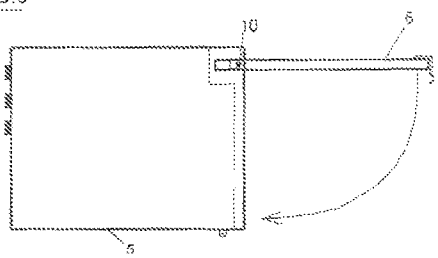
FIG.4
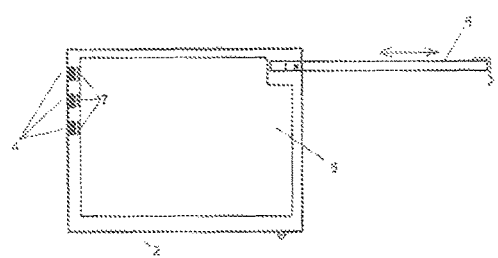
FIG.5 CUT B-B
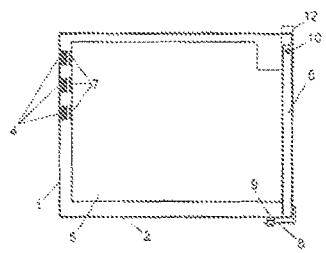
FIG.6

FIG.21
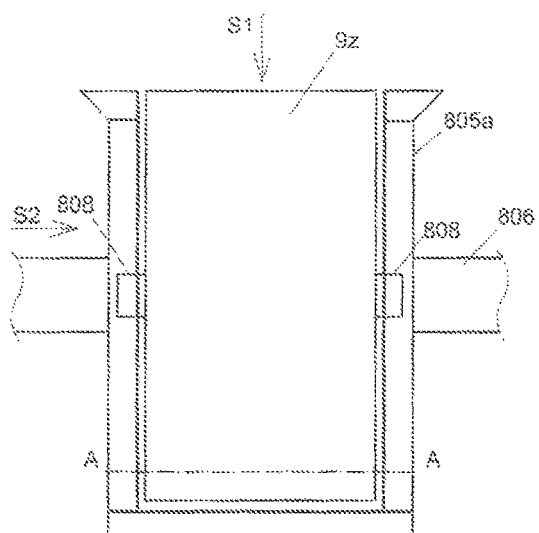
FIG.23
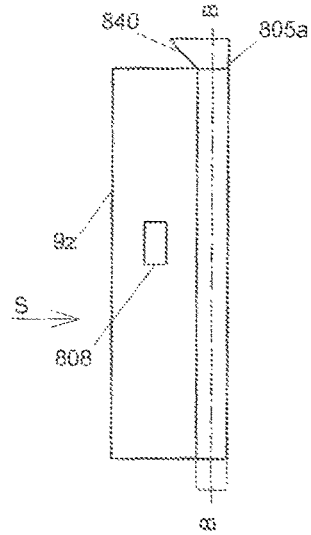
FIG.22
CUT A-A
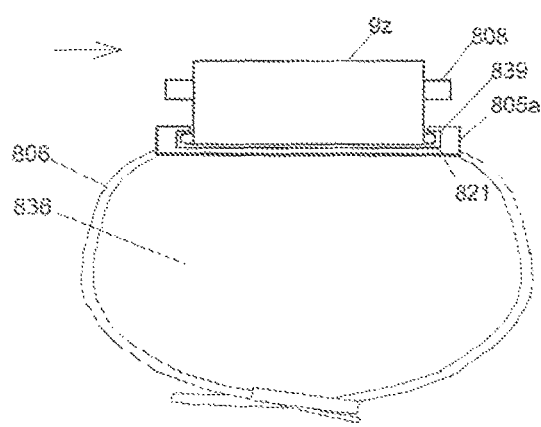
FIG.24
CUT B-B
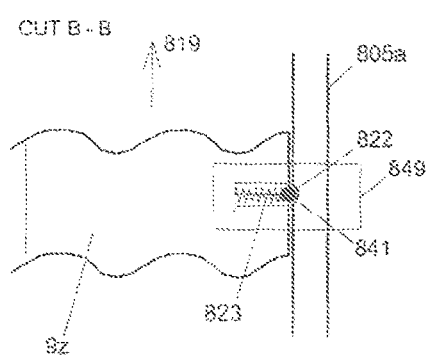
DETAIL
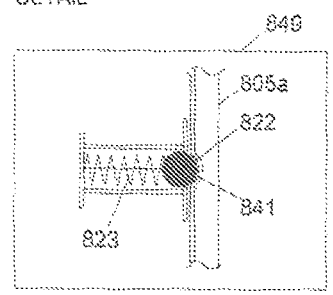

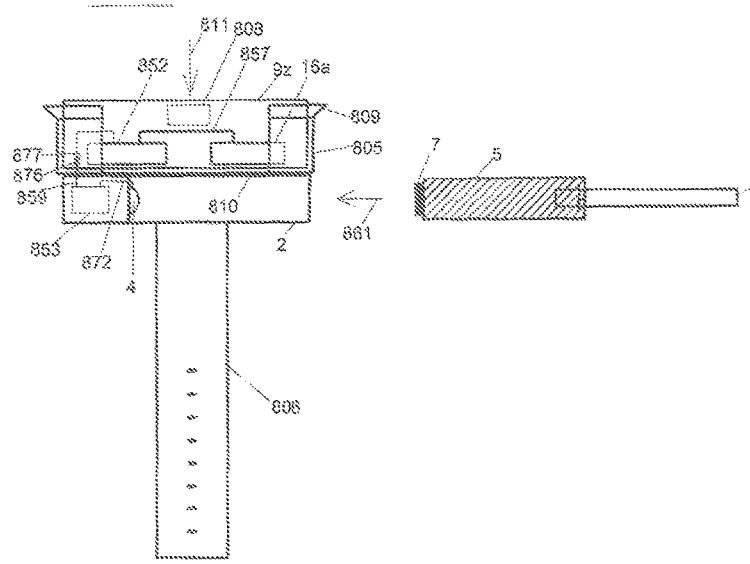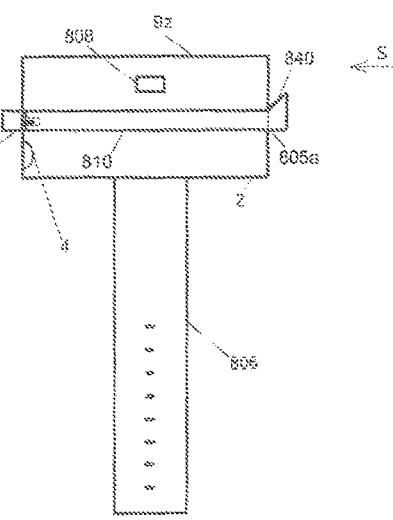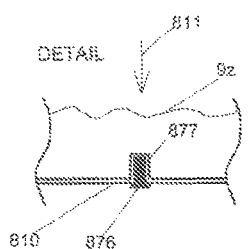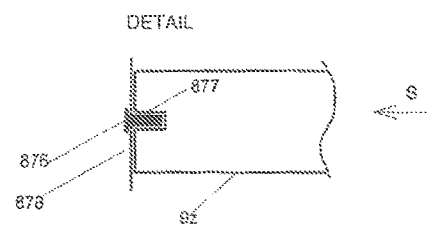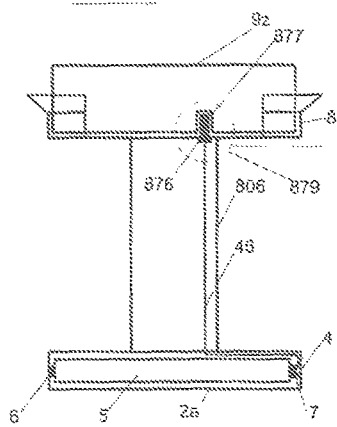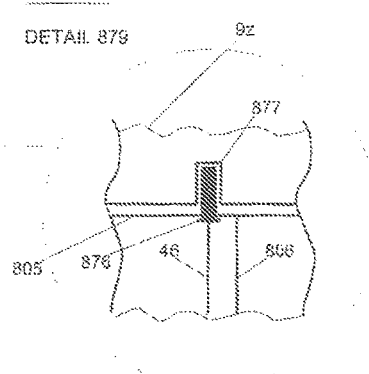

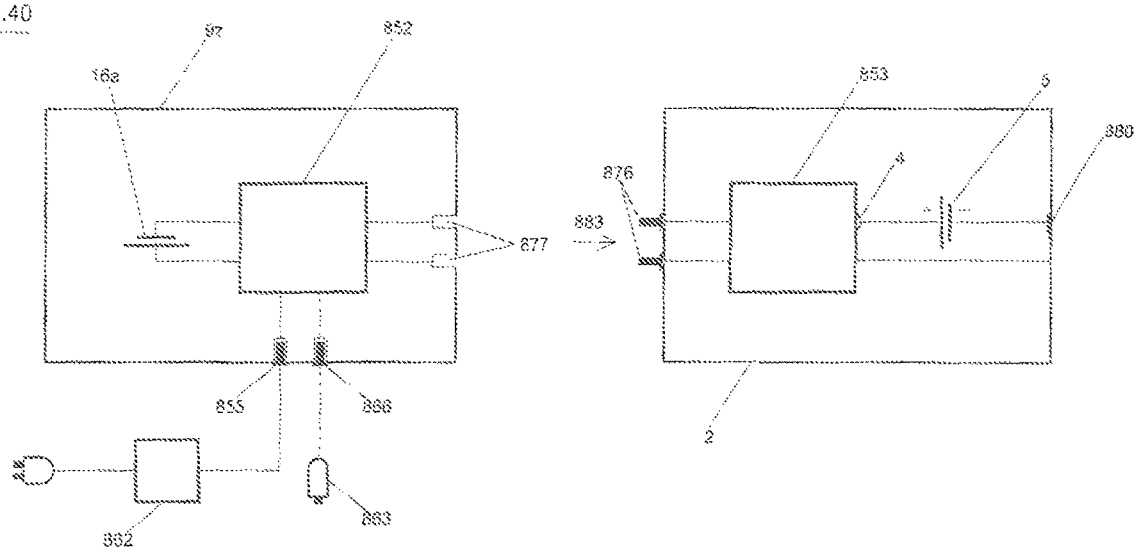
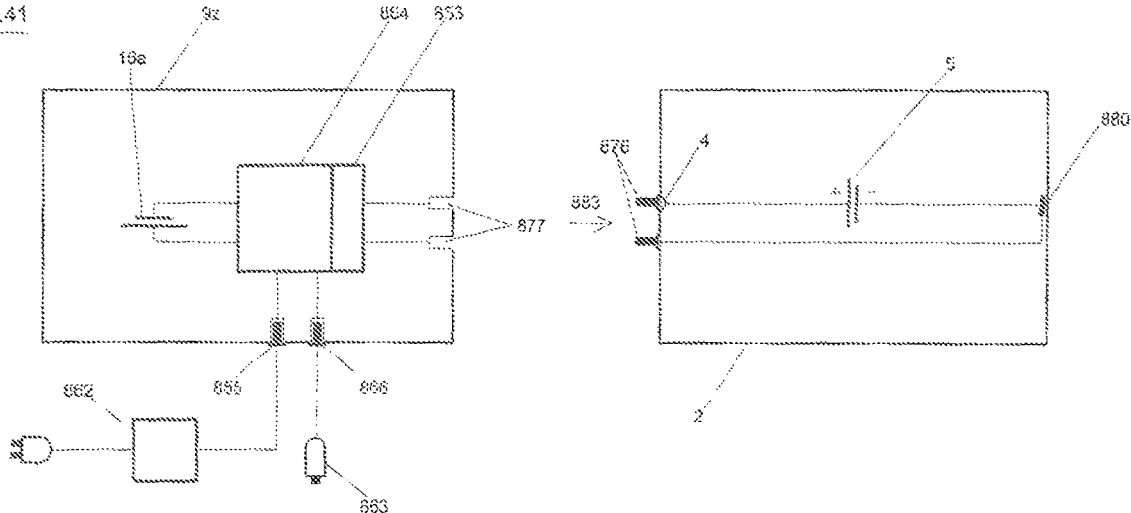
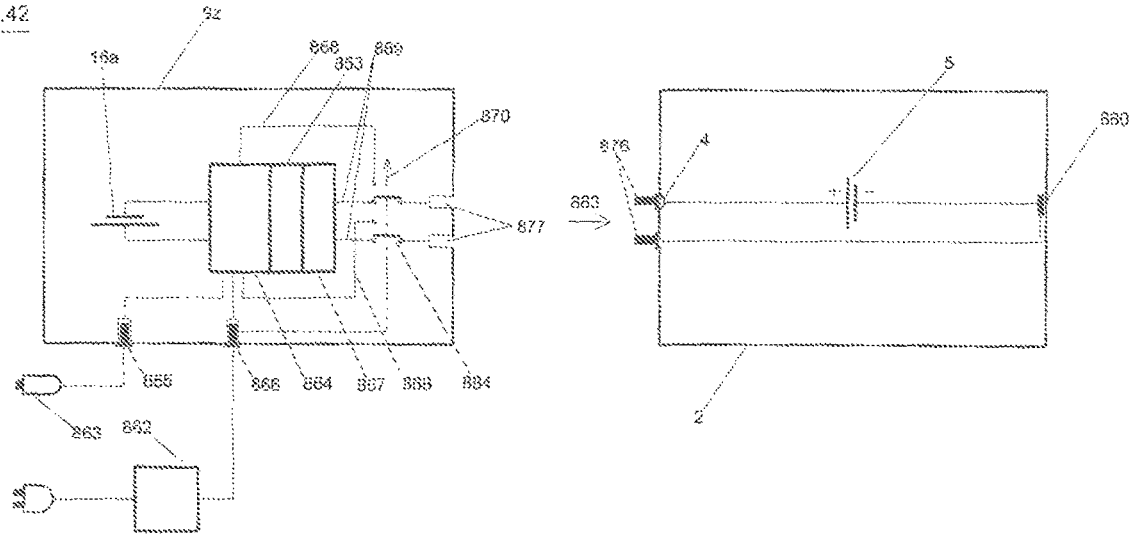

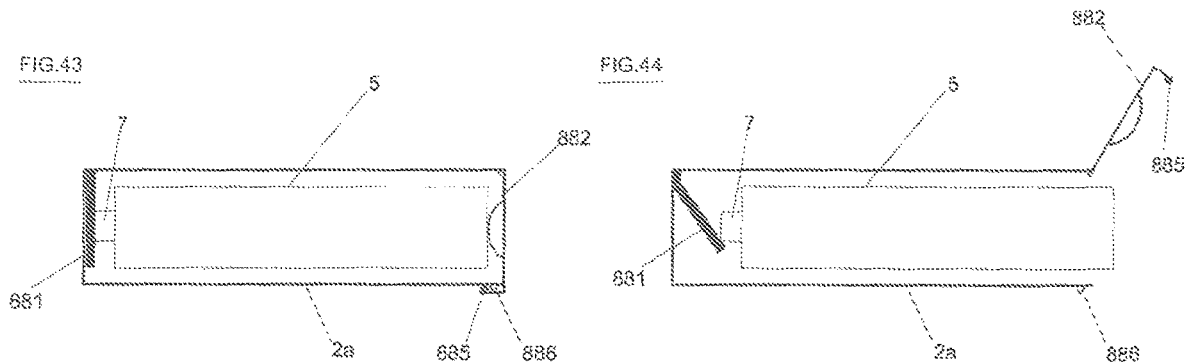

MOBILE PHONE WITH ENHANCED FUNCTIONS

TECHNICAL FIELD

The invention concerns batteries and earphones for mobile phones. Batteries are solved in such a way that their replacement is enabled during operation. Earphones are to be used especially in the connection with mobile phones attached to bracelet and enable discrete eavesdropping within simple manipulation.

Further, the technical solution concerns the mobile equipment that is put as removable in holder, attached on wrist and able to be fastened in other holders, placed accordingly the need in such a way that monitoring device may be traced and easily controlled.

Existing Status of Technology

For easy emergency manipulation are available on the market mobile phones set on bracelet for fastening on wrist. The disadvantage of these phones is in reduced capacity of battery which has to be of smaller size than the batteries of standard mobile phones held in hands because there is not space on wrist for larger batteries. Due to such a reason operation of mobile phone on wrist is timely limited on shorter period than in case of standard mobile phones and is necessary relatively often replacement of batteries in case that is not possible to recharge battery at the moment when the capacity is running out. This manipulation is lengthy because it is necessary to take off bracelet from the wrist. Further, at the replacement of battery the operation of mobile phone is cut, afterwards replacement reset has to be made, therefore during this time there is a drop-out. Due to these reasons the bracelet mobile phones are not used too much. The problem of battery replacement also occurs m case of standard mobile phones when the replacement means operation cut for mobile phone. The replacement of battery is mechanically exacting, because before the taking off the battery from mobile phone held in hand the cover of phone has to be removed. Except of it, in case of existing bracelet phones is not possible to put phone to ear and talk discretely, but the loud phone is used. As an option it can serve the phone communicating through bluetooth. But this is relatively dimensional, carried usually in the pocket and therefore needs relatively complicated manipulation for to be set. Further, it needs own battery and therefore recharging. Further, the mobile device which is often necessary to monitor or handle with, is mostly carried in pocket or purse. But for their examination and operation is required the manipulation to seize and take off them, which delays. In case of steady placement on wrist bracelet they can be used only with the restriction, especially in case of mobile phones, if it is not possible to put earphone, installed in the mobile phone, to the ear. The wireless earphone is the complication. That is why the mobile phones fastened to the wrist are hardly used. The earphone fixed to twisted cord connected to mobile phone on bracelet, described in patent No. PV2011-446, which is tied together to this patent, makes better use of these mobile phones, but not up to the same extend like presented invention.

Objective of the invention is device enabling easy replacement of battery during the operation. Further, in case of mobile phones on bracelet the possibility to put the phone to the ear without manipulation with earphone or with the simple one.

On the top of it, for earphone not to require own battery which has to be recharged. The next objective is to use in a simply way the mobile phones placed on bracelet also for the operation with earphone without connection of external earphone.

SUBSTANCE OF THE INVENTION

The disadvantages are eliminated and objective of invention reached by means of mobile phone with replacement of battery within the operation, where except of operation battery there is also standby battery which keeps phone in the operation during the replacement of operation battery. It is possible to replace both batteries one by one, without interruption of operation. It is possible to store battery in handy case, which can advantageously keep miniature charger for to be able to charge battery in terrain. In order not to be necessary to replace standby battery, this can be of minimum capacity required for keeping of operation during the time of main battery replacement and can be recharged from external charger or operation battery in case when the external charger is not available. In order to achieve for recharging higher voltage than there is the idle status voltage without recharging, is possible to use with the advantage the operational battery with higher idle status voltage than standby battery. In this case is possible to adapt the mobile phone for to be able to tolerate the scattering of voltage from operation as well as standby battery, par example by decrease of voltage of main battery. In order not to adapt mobile phone as far as voltage is concern, it is possible to use, with the advantage, two standby batteries, which are parallel connected at the moment of recharging and in series at the time of replacement of operation battery. The suitable charging current ensures resistance or electronic charging control unit, which switches off the recharging after it is finished. The switch over from parallel to the serial connection is possible to do by change over switch, mechanical or with the advantage, in electronic way. For to enable replacement of batteries is possible to place them, with the advantage, on conducting bars, by them is possible to slide them out, or into case. After insertion into the position, in which the contacts of battery and phone fit closely one to each other, the batteries are advantageously locked by catch or manual lock handled by user. For simple sliding out the lock can serve as pull bar, after unlocking, by which is possible to push battery or pull it out. In case of mobile phones on bracelet the battery is placed into the flat case advantageously placed on bottom part of phone that is fastened on wrist and from which is possible to slide out battery sideways, without necessity to unfasten the bracelet. Mobile phones can advantageously have earphone fastened on bracelet so that it could be possible to put it to ear, without being unfastened, only by movement of arm which wears the mobile phone. It is possible by placement of earphone, with the advantage, on bottom part of bracelet, i.e. on opposite side than there is mobile phone provided, that it is worn on the upper part of wrist. It requires put palm close the head, above temple, for to place earphone on ear, therefore not in very comfortable position and therefore it is suitable only for short emergency use. Enabling of normal fingering of earphone on ear is allowed by taking off the earphone out of holder on phone, in case of placement of bracelet on left hand, by right hand and putting it in the fingers of left hand. The advantage of this manipulation is that the microphone has not to change its place, it can remain to be fastened on bracelet because in case of closing of earphone to the ear by fingers, it is near the mouth and able to register speech. It enables advantageous one-way connection between phone and earphone instead of two-directional one, in case of moving of microphone too, therefore micro-phone. One-directional connection to earphone is possible to realize advantageously by radio connection by means of miniature transmitter and receiver. With the advantage it is possible to connect earphone alternatively by cable winded up on the reel which is placed on bracelet from which the cable is unrolled at the moment of taking off the earphone out of the holder and is winded up back automatically. Also it is possible to use, with the advantage, spiral stretchy cord. In case of preference to carry phone on bracelet, on upper part of wrist, therefore turned away of palm, it is possible to have advantageously microphone and removable earphone placed on opposite side of bracelet, therefore on the side turned towards the palm. In such a case the earphone and microphone are connected by cable, with the advantage, or wireless with phone. Cable can be advantageously pulled by bracelet or alongside it With the advantage on this side of bracelet turned towards the palm, therefore on opposite side than where is placed mobile phone can be installed batteries both operation and standby advantageously in case attached to arm and held by bracelet, from which the batteries can be sideways sled out as described above. The connection with mobile phone is realized by cable advantageously installed on or in bracelet. Cable from batteries or also microphone and phone can be led to the mobile phone permanently or advantageously by connecter. In case that advantageously the low capacity battery is used only for realization of operation for the time of battery replacement, this can be advantageously placed in mobile phone without possibility to take it off without operation interruption and only operation battery is placed as removable, without operation interruption. With the advantage alternatively it is possible to recharge battery also in mobile phone without taking off cable out of charger, or fro standby high capacity battery which can be carried in the pocket and recharge accordingly the need when current is available.

Further, the above indicated deficiencies eliminates the mobile device which can be advantageously formed by central control unit and which is possible to slide as removable in the holder, fastened par example on the wrist bracelet, or small stand which can be advantageously fastened to the handlebars of bike or on board of car or put down on table whereas it is possible to take it off and use individually or move into other holders placed par example on indicated small stands or ribbon round the neck. Alternatively it is possible to use Velcro zipper instead of holder, with the advantage, for removable fastening. Central control unit cart be advantageously formed par example by mobile phone as described in patent No. PV2011-446 which is tied together with the patent just presented.

Central control unit is held advantageously in holder par example by catch, which is possible to release by buttons, installed on both sides of mobile device for to enable the manipulation by thumb and forefinger, by pressing for to remove the central control unit out of holder, during which is possible advantageously automatically receive the eventual incoming call by means of phone operation, whereas in case of ongoing call with loud communication this is switched over automatically on telephone operation namely by means of contacts connected at the moment of taking off central operation unit linked up into the microprocessor control unit of mobile phone or central control unit. The sliding into holder is advantageously possible from up or side. The fastening of central control unit in holder on bracelet or small stands enables the easy monitoring of data or curves, with the advantage without the interruption especially when warning signal activated by central control unit in case of deviation of data from the set limit. Advantage is the monitoring by central control unit placed in holder on bracelet at the contrary of mobile device kept par example in pocket how it is common under the current condition of technology. The described easy monitoring of data and curves is advantageous par example for sportsmen, monitored persons or patients suffering especially from heart illnesses, drivers or pilots checking their health condition for to ensure safety driving or flight. As described in patent PV2011-446 the mobile device formed advantageously by central control unit can indicate condition of monitored person and by warning signal to urge monitored person to do test of normal reaction. It is easily workable under the condition of placement of mobile device in holder placed on bracelet with possibility of move, on suitable small stand or ribbon round the neck. The big advantage is, if central control unit is formed by mobile phone fastened in holder, easy receiving of incoming call or SMS when receiving person can have visual check on number of caller on display and put call on operation by activation of respective button, or on phone operation during the taking off of mobile phone from wrist holder without lengthy manipulation with mobile phone par example when it is taken out of pocket. The advantage for telephone operation is that by simple pressing of button by thumb and forefinger it is possible to take out at once mobile device of case by the parallel receiving of incoming call on phone operation or switch over on phone operation in case that it has been already received on loud operation and possibility putting to ear. The devices manufactured under the condition of existing level of technology do not have the indicated advantages. Invention can be advantageously applied also for another use when the mobile device is reserved for monitoring of lumps of information, data, graphs, messages, reports or music created par example by compasses, radios, remote monitoring of data from electronic security systems, electronic fire systems, receivers or transmitters or combination for connection with centre par example of taxi centre, surveillance centre and others.

With the advantage it is possible to use both enhancements and simple replacement of battery during the operation of central control unit advantageously formed by mobile phone and possibility to place the central control unit in case in removable way. In such a case the electrical energy of batteries is led to central control unit by connecters. With advantage it is possible to place exchangeable batteries into the case on bottom side of bracelet which is enabled due to smaller dimensions of holder without batteries. For simplicity it is possible to use with the advantage only one exchangeable battery whereas operation of central control unit together with this battery is provided by battery placed inside central control unit. This one ensures also overcoming of time of replacement of batteries. With the advantage it is possible to reduce the capacity of this battery onto overcoming of expected time of the longest phone calls within which is central control unit taken out of holder for to be put to ear and therefore is not supplied by energy from exchangeable battery. The diminution of battery is substantial namely in relations of usual operation time of approx. 12 hours reduced only to one hour of overcoming time for telephone call. If the central control unit was not removable out of holder and the described principle was used, par example to put earphone to ear, battery of central control unit could be even more reduced because only time for replacement of battery would be overcome.

As alternative to the voltage of battery of central control unit is the placement of power converter into case of exchangeable battery from which the voltage is led by connector in central control unit where is installed charger connected to battery of central control unit. This can be alternatively charged through other connectors either from network adaptor or USB computer port. Instead of charger of supply regulator can be used but with higher loss of energy. Advantage of this alternative is that central control unit formed by standard mobile phone can be supplied.

As another alternative of supply is not to place converter of voltage in holster of battery but to install combined charger with entry regulator of voltage or converter. This alternative is more simple but is not possible be used for standard mobile phone where is necessary to install this special combined charging unit.

Further alternative is to add to combined charging unit charger of exchangeable battery which is then possible to charge simultaneously with battery of central control unit, from external supply. As alternative securing of exchangeable battery in case it is possible to use advantageously small door which is held closed by valve. By door opening spring for contacts with poles of battery pushed battery out of case up to the point where is possible to remove battery by fingers.

LIST OF FIGURES

Figure 8:
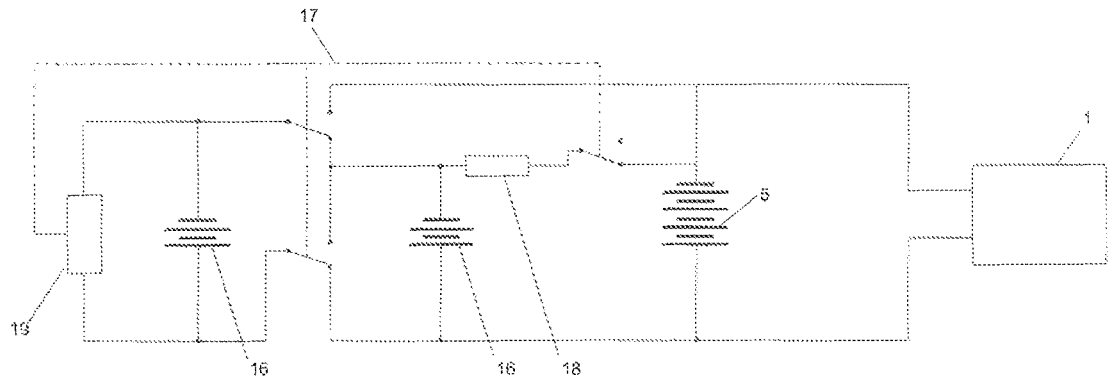
Figure 9:
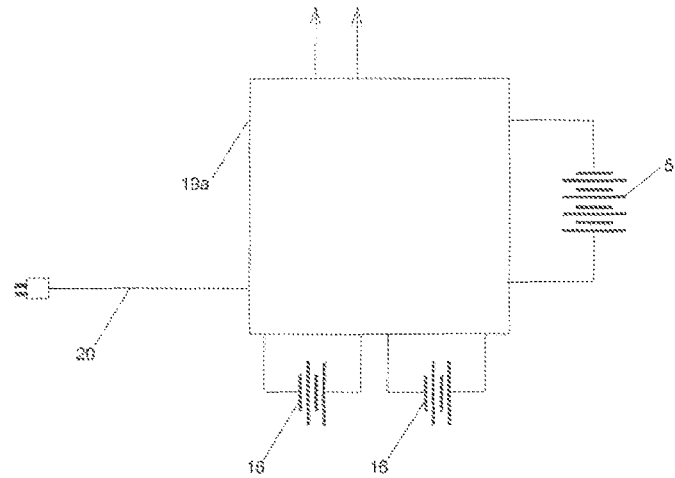
Figure 10:
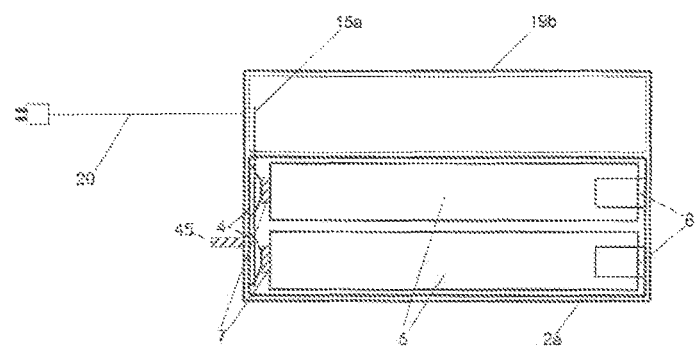
Figure 11:
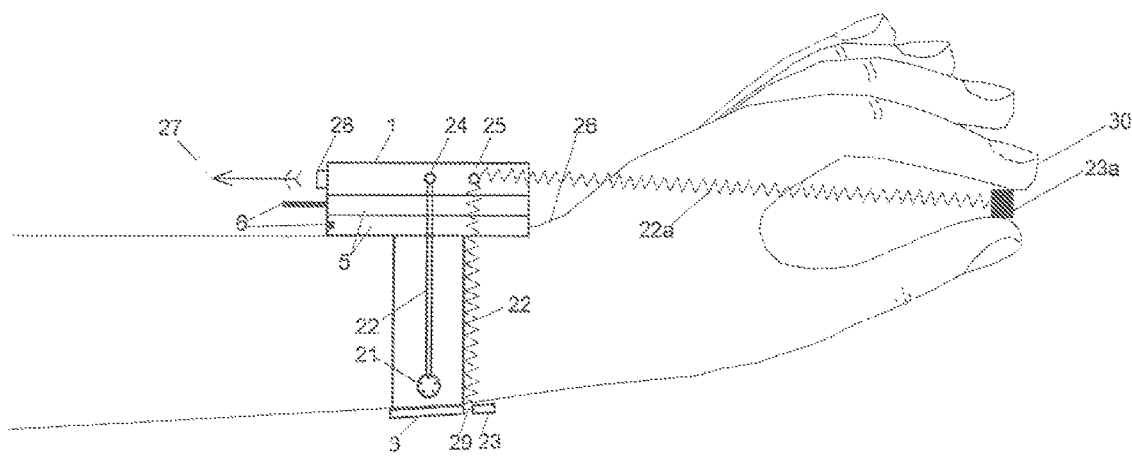
Figure 12:
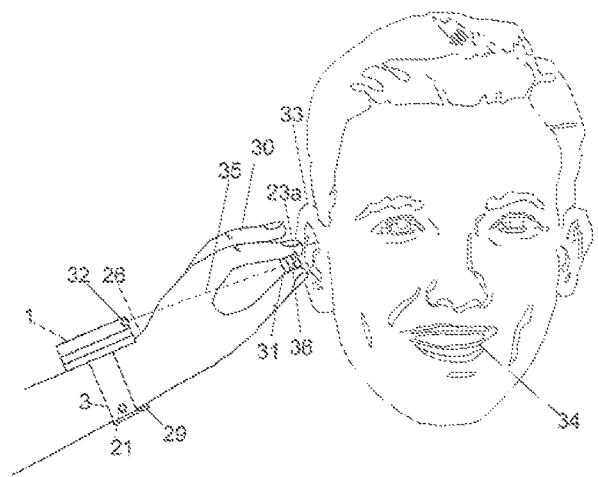
Figure 13:
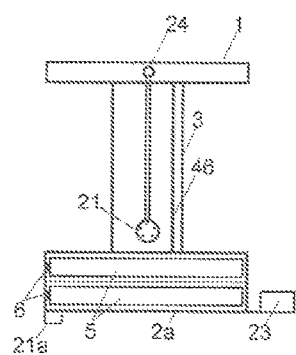
Figure 14:
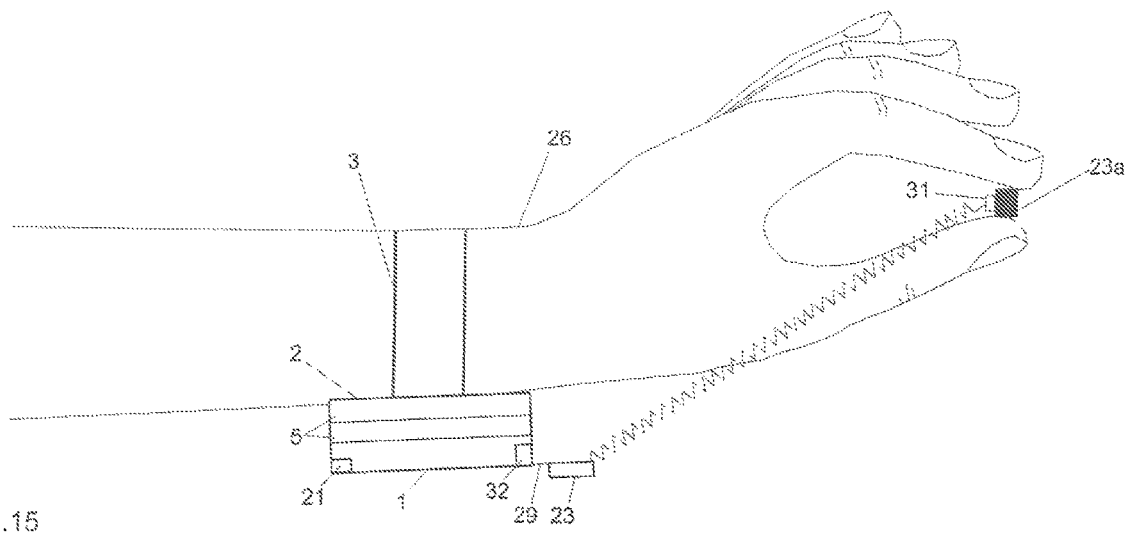
Figure 15:
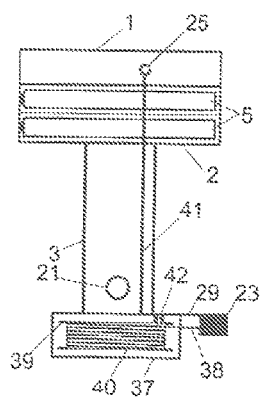
Figure 16:
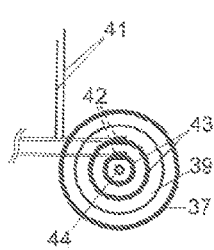
Figure 17:
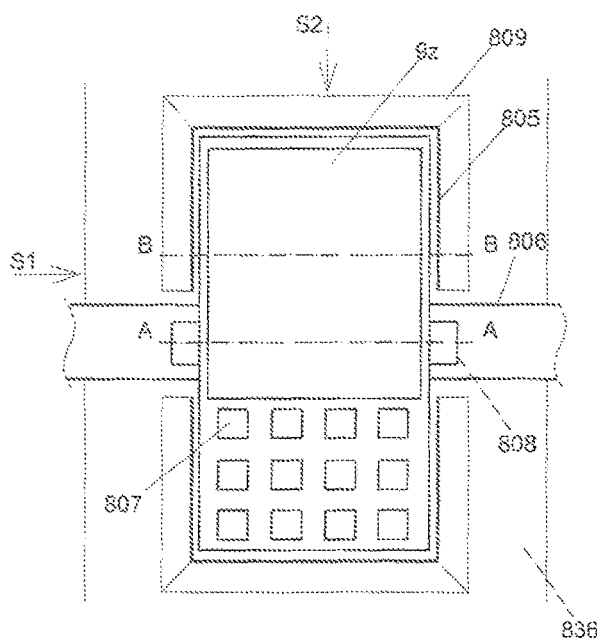
Figure 20:
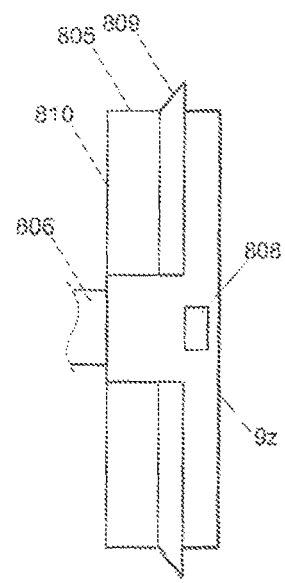
Figure 18:
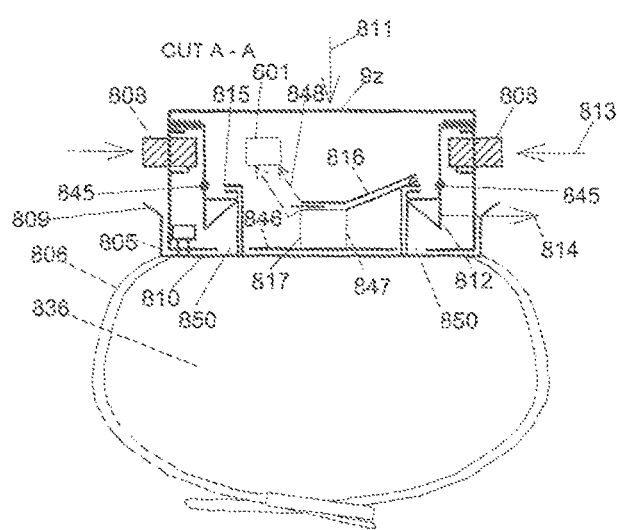
Figure 19:
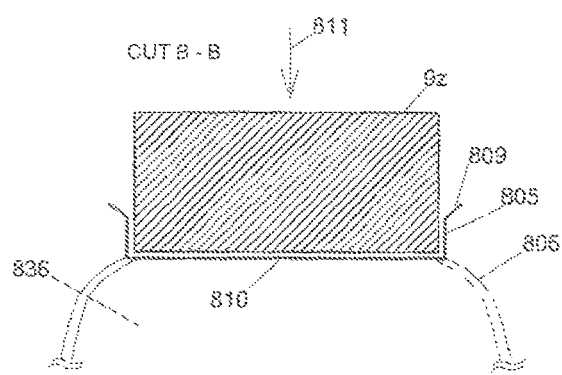
Figure 25:
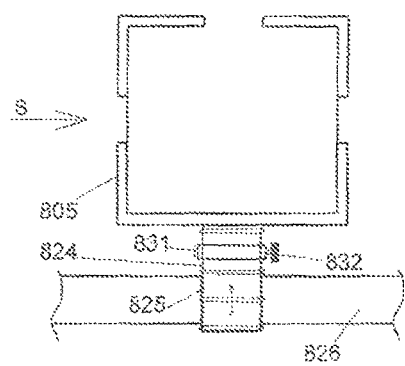
Figure 26:
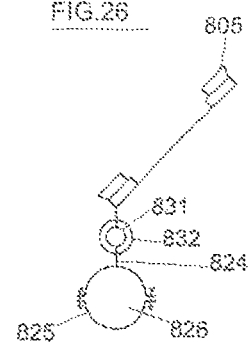
Figure 27:
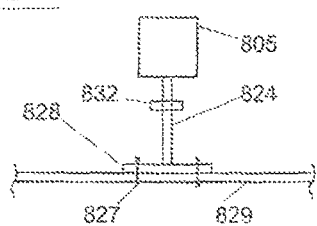
Figure 28:
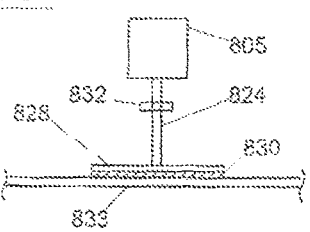
Figure 29:
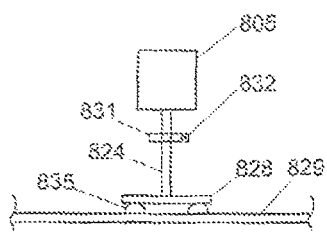
Figure 30:
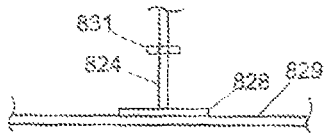
Figure 31:
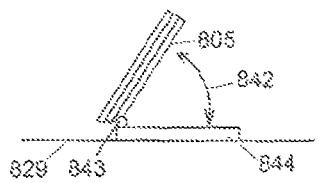
Figure 32:
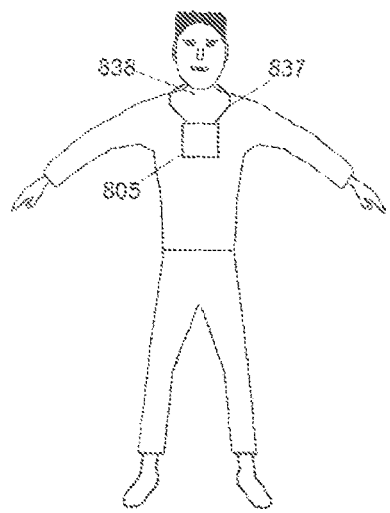
Figure 33:
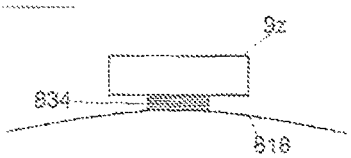

FIG. 1: Frontal view at mobile phone with possibility of battery replacement during operation, without battery.
FIG. 2: Side view—with removed batteries.
FIG. 3: View at battery from above.
FIG. 4: Mobile phone with inserted batteries.
FIG. 5: View at inserted battery in cut, with lifted valve.
FIG. 6: View at inserted battery in cut, with shut valve.
FIG. 7: Mobile phone with one exchangeable battery and built-in standby batteries of lower capacity.
FIG. 8: Scheme of recharging of built-in batteries.
FIG. 9: Charger of batteries.
FIG. 10: Cartridge of batteries chargeable from miniature electronic charger onto fastened.
FIG. 11: Mobile phone fastened on bracelet with possibility of use of earphones fastened to bracelet connected by spiral cable.
FIG. 12: Use of wireless connected earphones.
FIG. 13: Batteries replaceable during operation, fastened to bracelet front below.
FIG. 14: Mobile phone fastened to bracelet under wrist.
FIG. 15: Mobile phone fastened on bracelet above wrist and battery fastened under wrist.
FIG. 16: Detail of winch.
FIG. 17: View at mobile device formed by central control unit placed in holder.
FIG. 18: View at central control unit in cut A-A.
FIG. 19: View at central control unit in cut B-B.
FIG. 20: View at central control unit from direction S1.
FIG. 21: View at central control unit inserted into holder from side.
FIG. 22: View at central control unit in cut A-A.
FIG. 23: View at central control unit in sight S2.
FIG. 24: View at central control unit in cut B-B.
FIG. 25: View at holder fastened to handlebars.
FIG. 26: View at holder fastened on handlebars in sight S.
FIG. 27: View at holder screwed to board.
FIG. 28: View at holder fastened to board by Velcro fastener.
FIG. 29: View at holder fastened to board by suction cups.
FIG. 30: View at holder put loosely on board.
FIG. 31: View at holder standing on board.
FIG. 32: View at holder fastened on ribbon.
FIG. 33: View at control unit fastened by Velcro zipper.
FIG. 34: View at control unit inserted as removable from above in holder, which has on bottom part holder for battery.
FIG. 35: View at control unit inserted in holder from side.
FIG. 36: View at detail of connector for insertion from above.
FIG. 37: View at detail of connector for insertion from side.
FIG. 38: View at case of battery fastened on bracelet from below.
FIG. 39: View at detail of connector.
FIG. 40: View at block scheme of operation and recharging of central control unit from exchangeable battery, where converter of voltage is in battery case.
FIG. 41: View at block scheme of operation and recharging of central control unit from exchangeable battery where converter of voltage is in central control unit.
FIG. 42: View at block scheme of operation and recharging of central control unit from exchangeable battery where converter of voltage is together with charger of exchangeable battery in central control unit.
FIG. 43: View at battery secured in inserted position of rebate.
FIG. 44: View at battery slightly sled out by action of spring when the small door is open.

EXAMPLE OF REALIZATION OF INVENTION

On FIG. 1 is depicted mobile phone 1 at frontal view with battery case 2, which is open from front for insertion of batteries 5, drawn on FIG. 2, with flexible contacts 4 for batteries, which are interconnected for parallel connection of batteries 5, drawn on FIG. 2, connectors 15, and led into mobile phone 1, drawn on FIG. 2. Contacts of battery 7 drawn on FIG. 2 are to be pressed to them.

With the advantage the described devise can be applied on mobile phone placed on bracelet 3 that is to be worn on wrist.

On FIG. 2 is depicted cut A-A of mobile phone 1 at side view, where the batteries 5 can be inserted into case 2. Sliding out is made easier by small levers 6 which are drawn in overturned position.

On FIG. 3 is depicted battery 5 at view from above where small lever drawn in overturned position is turned around pin 10.

On FIG. 4 are depicted batteries 5 inserted in case 2 whereas contacts of battery 7 fit closely on flexible contacts 4 of case 2.

On FIG. 5 is depicted case 2 at view from above at cut B-B with battery 5 inserted inside.

On FIG. 6 there is the same view as in case of FIG. 5, but with small lever 6 in closed position, where battery 5 is pressed to flexible contacts 4 of case 2 secured in case by end of small lever 12 pivoting around the pin 10 intruding through cut in case Hand leaning on the wall of cut of case 14. Small lever 6 is secured in closed position by spring 8 which fits in overhang 47 on case 2. Batteries 5 are connected parallel, as indicated on FIG. 1. By battery replacement small lever 6 is sled by turn of 90 degrees into position depicted on FIG. 5 and by pull on small lever 6 is taken out the case during operation of mobile phone 1 which is fed by second battery. Batteries are replaced one by one for to keep the operation. Advantage of this replacement is that operation of mobile phone 1 is not during it interrupted, it brings additional advantage that it is possible to use batteries of lower capacity that in case of mobile phones that are not enabling the replacement of batteries during operation and without interruption of operation is possible only recharging of batteries placed in mobile phone that is possible only when there is available access to electrical network. Therefore batteries in phones not enabling recharging during operation have to secure longer operation and have bigger dimensions. Advantage of replacement of battery during operation applies itself also in case of mobile phones in bracelet placed on wrist because for replacement of battery is not necessary to unfasten the bracelet because battery is possible to insert sideways the wrist.

On FIG. 7 is depicted mobile phone 1*a*, in which there is only one battery 5 replaceable during the operation which is kept by batteries of low capacity 16 which, with the advantage are recharged from battery especially after the insertion of recharged battery 5. When battery 5 is taken out for to be replaced, capacity of small batteries 16 which is stipulated in such a way for to be sufficient for operation of mobile phone 1*a* during the time of replacement of battery 5, keeps operation.

On FIG. 8 is depicted scheme of recharging of small capacity batteries 16 from battery 5, whereas small capacity batteries 16 advantageously have half voltage than battery 5 and for recharging are parallel connected by means of three segments reverser. Recharging runs via resistor 18. With advantage automatic electronic unit for recharging 19 measures the charging voltage on small capacity batteries 16 and when corresponds with charged status, switches over automatically small battery in series by reverser 17 that controls. This can be manufactured par example of semi-conductors with advantage of solid state. Reverser 17 is depicted in condition of parallel recharging. By switching over to the second position the small capacity batteries 16 are in to the connection in series, parallel to battery 5 for charging of mobile phone 1 which is possible to take out for replacement.

On FIG. 9 is depicted automatic electronic unit for recharging 19*a* which regulates also charging current and switches over small capacity battery 16 from connection in series into parallel one for charging from battery 5 and back for operation. It enables recharging from network of 220V through main 20.

On FIG. 10 is depicted case 2*a* for standby batteries 5, with advantage joined by connection 15*a* to automatic electronic unit for recharging 19*b*. It enables to recharge standby batteries 5 accordingly the need for network 220V via main 20 and keep them in emergency for replacement. Electronic unit for recharge is removable out of case for easier transport of batteries which can be in such a case recharged from external charger by means of connector socket 45 for its connection.

On FIG. 11 is depicted mobile phone Hastened on bracelet 3 fitted closely to wrist 26 where batteries 5 are removable by means of small levers 6 from which one is depicted in overturned state. Taking out is possible in the direction of arrow 27 alongside wrist 26 during the operation of mobile phone 1 without unfastening of bracelet of wrist 26. On lower side of bracelet is placed advantageously micro-phone 21 connected to mobile phone 1, par example by means of cable 22 by connector 24. There is also advantageously placed earphone joined by means of spiral cable 22 by connector 25 to mobile phone. In case that loud operation of mobile phone 1 is not required, on which it is possible to switch over by button 28, earphone 23 will be functional by activation of phone connection and it is possible to make wiretap by putting it on ear by move of lower part of wrist 26. For more comfortable operation it is possible advantageously take out earphone 23 of holder 29 where is sled on as removable, by other hand than on which is worn bracelet 3 and grasp it by fingers 30 where is depicted as earphone 23*a* whereas cable 22, which is flexible, will extend itself up to cable 22*a*. Now is possible to put comfortably earphone 23*a* to ear and listen to discreetly. Advantage of connection by cable 22 is especially in the fact that earphone is supplied by power energy from mobile phone 1 and does not need battery as it would be in case of wireless connection.

On FIG. 12 is depicted detail of putting of earphone 23*a* hold in fingers 30 to ear 33 after removing from holder 29. It is evident that micro-phone 21, fastened on bracelet 3, is in such a position of wrist 23 where is earphone 23*a* put to ear in relatively small distance from mouth, which is advantageous for recording of call. Earphone 23*a* is connected with the advantage in this example wireless by means of one directional radio frequency connection 35, ensured by transmitter 32 and receiver 31. Reality that to ear is with the advantage put only earphone and not micro-phone means that the manipulation is easier, earphone is possible to adapt for insertion into ear so that it could be steady in it and on contrary to micro-telephone where is micro-phone as well, does not need bidirectional connection and is therefore less large sized, receiver 31 is more simple that the bidirectional one which is necessary for micro-telephone and takes less energy from battery or accumulator 36 installed in earphone.

On FIG. 13 is depicted mobile phone 1 fastened on bracelet 3 from above where batteries 5 are fastened from bottom on bracelet 3 and connected by cable with mobile phone. Alternative placement of micro-phone 21 is micro-phone 21*a* on case 2*a*.

On FIG. 14 is depicted mobile phone 1 worn on wrist 26 from below micro-phone 21 that is placed in mobile phone 1.

On FIG. 15 is depicted mobile phone 1 where on bracelet 3 from below there is fastened winch 37 with pivoting reel 39 from which cable 28 is unrolled, at the moment of taking out earphone of holder. When the earphone is put back in the holder 29 cable 38 is rolled back on reel 39 which is secured by spiral spring 40 which is stretched during the winding off of cable 38. This secures connection of earphone 23 with mobile phone 1 even by cable 41 with the advantage by means of flexible metallic bus bars 42 fitted tightly to metallic double inter rings on reel 39 to which is cable 38 connected and in such a way is secured connection of both cables even when reel 39 is pivoting.

On FIG. 16 is depicted winch 37 in detail with reel 39 with inter rings 43 on which are tightly fitted flexible bus bars 42 connected to cable 41. Reel turns around axe 44.

On FIG. 17 is depicted mobile device that can be with the advantage formed by central control unit 9*z* or mobile phone. Central control unit 9*z* was described in patent PV2011-446 to which this patent is a continuation. Central control unit that can be formed, with the advantage, by mobile phone, is possible to insert into holder 805 where is advantageously fastened, par example on bracelet 806 on wrist 836 for emergency monitoring of curves and data and even for operative manipulation as well, what is par example receiving of call or SMS messages without necessity of manipulation when it is to be taken out of pocket or case. It is possible to receive calls by button 807 which simultaneously is switching the loud operation of hands free (HF). For putting to ear it is necessary to take out central control unit 9*z* of holder 805 by pressing of loosening buttons 808 that simultaneously receive call, or if it had already been received by loud operation of "HF", switch over on earphone.

With the advantage is holder 805 in the same execution placed on other places how described on FIG. 9-17. By this is enabled to shift central control unit 9z to these places by its insertion into respective holder 805.

On FIG. 18 is depicted cut A-A in sight from S2 on FIG. 17 holder 805 which has leading edge 809 enlarged from bottom 810 of holder for insertion of central control unit 9z when sled from above in the direction of arrow 811 where at the moment the bolts 812 turning around joint 845 press them and remove them in the direction of arrow 814 farther than there is edge of stop 815 fastened to bottom 810 of holder 805 and therefore loose the way for pulling out of central control unit 9z out of holder 805 whereas stops 815 pass through slot 850, contacts 816 are unfastened then, fixed by distant extension 847 to bottom 846 of central control unit Wire connectors 848 are interconnecting contacts 817 with microprocessor unit 601 of central control unit 9z which accordingly state of contacts 818 prepares order for receiving of call by pulling out of central control unit and ending by its re-insertion.

On FIG. 19 is depicted cut B-B at sight to S2 illustrated on FIG. 17.

On FIG. 20 is view on holder 805 in cut A-A from S1, illustrated on FIG. 17.

On FIG. 21 is depicted holder 805a into which is possible to insert central control unit 9z in the direction of arrow S1 from side.

On FIG. 22 is depicted cut A-A at sight to S1 illustrated on FIG. 21 after insertion of central control unit 9z into holder 805a, held by bar 821 in furrow 839 formed by rail for loose pushing of bar 821.

On FIG. 23 is view in the direction S1 illustrated on FIG. 21 of holder 805a with leading edge 840 for easy insertion.

On FIG. 24 is depicted cut B-B from FIG. 7 in the direction S with stabilization by means of ball 822 facing to hole 841 in holder 805a when at pulling out of central control unit 9z in the direction of arrow 819 the ball 822 steady in pulled out position by string 823, is inserted and makes loose central control unit 9z for to be pulled out. Detail 849 illustrates parts of stabilization in increased scale.

On FIG. 25 is depicted small stand 824 with holder 805 fastened by socket 825 on handlebars 826 of bike turning around joint 831 which is possible to bring to stop by screw 823 with button.

On FIG. 26 is view from S illustrated on FIG. 25.

On FIG. 27 is depicted small stand 824 with foot 828 for fastening by screws 827, par example on plate 829.

On FIG. 28 is depicted small stand 824 attached to board by fastening material 830, par example by sticking tape, glue or removable Velcro fastener to opposite piece 833.

On FIG. 29 is depicted small stand 824 attached to board 829 formed par example by glass plate or front window of car, by suckers 835. Small stand is turning round the joint 831 for suitable setting and stabilized for adjustment by tightening of screw 832 with button.

On FIG. 30 is depicted small stand 824 with foot 828, loosely laying on board.

On FIG. 31 is depicted holder 805 turning as shown by arrow 842 round joint 824 with points for stop, connecting it with base 844 standing on board 829.

On FIG. 32 is depicted holder 805 fastened on cord 837 with advantage hung on neck.

On FIG. 33 is depicted removable central control unit 9z attached to opposite piece 818, formed advantageously by bracelet 806, small stand 824 or board 829, illustrated on FIGS. 21 and 29, by means of Velcro fastener 834 or another attachable preparation and it is possible to place it from one piece to another accordingly the need.

On FIG. 34 is depicted central control unit 9z advantageously formed by mobile phone, placed as removable in holder 805 where battery 5, illustrated as pulled out partly from case 2, when inserted in direction of arrow 861 by its contact of battery 7 sits on flexible contacts 4 interconnected by connector 872 to voltage converter 853 or regulator and from it by link 859 to connector 876 fastened on bottom of holder 810 and from it to socket 877 by which is voltage led to central control unit 9z by link 874 to charger 852 of central control unit 9z and further by link 857 on small capacity battery 16a of central control unit 9z.

On FIG. 35 is depicted alternative holder 805a into which is inserted sideways central control unit 9z in the direction of arrow S. Buttons 808 suit to loosening of central control unit 9z from holder 805a working on the similar principle as par example bolt 812 illustrated on FIG. 18 and simultaneously to receiving of call as it was described there. Alternatively it is possible to fix central control unit 9z in holder par example by ball 822 as it was described on FIG. 24.

On FIG. 36 is depicted detail of socket 877 and connector 876 placed in bottom 810 of holder, leading voltage to central control unit 9z in case of insertion from above.

On FIG. 37 is depicted detail of socket 877 and connector 876 placed on side of holder 878 in case of insertion of central control unit from side.

On FIG. 38 is depicted battery 5 inserted in case 2a on lower side of bracelet 806 where its voltage is led by cable 46 fastened in bracelet 806 to connector 876 and socket 877 through holder 805 placed on upper side of bracelet 806 and from it to central control unit 9z. Detail 879 is illustrated on FIG. 39.

On FIG. 39 is depicted detail 879 of placement of connector fastened to holder 805 inserted in socket 877 in central control unit by its insertion into holder 805.

On FIG. 40 is depicted block scheme of connection of exchangeable battery 5 for operation of central control unit 9z and recharging of battery 16a placed in central control unit 9z with the advantage formed by mobile phone. Plus voltage from exchangeable battery 5 is taken by flexible contacts 4, minus one is connected with frame of case 2 by means of contact 880. Inside converter of voltage 853 is placed or is placed regulator from which the trimmed voltage is led via connector 876 and socket 877 to central control unit with advantage formed by mobile phone, to charger 852 of central control unit 9z from which is not only recharged battery 16a but secured operation of central control unit 9z.

On FIG. 41 is depicted combined supply 864 which contains inside converter of voltage 853 or regulator through which is possible to trim voltage from battery 5.

On FIG. 42 is depicted combined supplier 864 containing also charger 867 of exchangeable battery 5 that is put in charging state by switching over of change over switch 884 into the drawn position and voltage is led by means of joints 869. In case of connection of external recharging automatically by electronic devices in combined supplier 864 change over 884 is switched in second position, where change over 884 secures voltage for combined charger 884 in the direction of arrow 870 by joint 868.

On FIG. 43 is depicted case 2a for battery 5 which is after its insertion set by small door 882 by bolt 885 locking into position jut out point 886.

On FIG. 44 is depicted how in case that small door is open bronze string 881 that simultaneously secures connection to contacts of battery 7 pushes out battery 5 partly from case 2*a* so it is possible to grasp it by hand.

The invention claimed is:

1. A mobile device comprising:
   - a central control unit for executing of phone calls and SMS,
   - a holder for holding central control unit,
   - a bracelet for fastening of the holder on a wrist,
   - a small capacity battery placed inside of central control unit,
   - a battery placed in battery case wherein
   - the small capacity battery placed inside of central control unit for supplying a power for central control unit when removed from the holder and
   - the battery placed in the battery case for supplying power for central control unit and for charging small capacity battery when the central control unit placed in the holder and the battery case is placed on the holder or on a bracelet separately from the holder.

2. The mobile device according claim 1 characterized in that
   the central control unit is placed removably in the holder in which the central control unit is held by means of arresting.

3. The mobile device according claim 2 characterized in that
   the central control unit is held in holder equipped by buttons for releasing the central control unit from arresting, whereas central control unit is removable and insertable from above by manipulation of one hand by action on both side button.

4. The mobile device according claim 2 characterized in that
   the central control unit is held in alternative holder and kept by a bar in furrow formed by a rail for loose pushing of bar.

5. The mobile device according claim 2 characterized in that
   the central control unit is held in alternative holder by means of a ball against hole.

6. The mobile device according to claim 1 wherein
   the central control unit is formed by a mobile phone.

7. The mobile device according to claim 1 wherein
   the central control unit is adapted for receiving phone call by pushing a button or automatically by removing from a holder and ending the phone call by its insertion back into the holder.

8. The mobile device according to claim 1 wherein
   the battery placed in battery case is replaceable within an operation of central control unit without removing of the central control unit from holder and without interruption of operation of central control unit.

* * * * *